(12) United States Patent
Petit et al.

(10) Patent No.: US 12,290,887 B2
(45) Date of Patent: May 6, 2025

(54) SYSTEMS AND METHODS TO CONTROL WELDING WIRE TENSION

(71) Applicant: Illinois Tool Works Inc., Glenview, IL (US)

(72) Inventors: Marc S. Petit, Appleton, WI (US); Todd G. Batzler, Hortonville, WI (US); Charles J. Romenesko, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 564 days.

(21) Appl. No.: 17/246,142

(22) Filed: Apr. 30, 2021

(65) Prior Publication Data

US 2022/0347784 A1    Nov. 3, 2022

(51) Int. Cl.
| | | |
|---|---|---|
| *B23K 9/133* | (2006.01) | |
| *B23K 9/12* | (2006.01) | |
| *B65H 59/38* | (2006.01) | |

(52) U.S. Cl.
CPC ............ *B23K 9/1336* (2013.01); *B23K 9/125* (2013.01); *B65H 59/384* (2013.01)

(58) Field of Classification Search
CPC .... B23K 9/125; B23K 9/1336; B65H 59/384; B65H 2701/36
See application file for complete search history.

(56) References Cited

U.S. PATENT DOCUMENTS

| | | | |
|---|---|---|---|
| 2011/0220629 A1* | 9/2011 | Mehn ..................... | B65H 51/30 |
| | | | 219/136 |
| 2014/0361116 A1 | 12/2014 | Enyedy | |

FOREIGN PATENT DOCUMENTS

JP          2015066562 A  *  4/2015

\* cited by examiner

*Primary Examiner* — Steven W Crabb
*Assistant Examiner* — Dilnessa B Belay
(74) *Attorney, Agent, or Firm* — McAndrews, Held & Malloy, Ltd.

(57) ABSTRACT

An example welding wire feeder includes: a push motor configured to feed welding wire from a wire source; a first sensor configured to provide push motor velocity feedback; and control circuitry configured to control the push motor and a pull motor of a welding torch coupled to the welding wire feeder by: controlling a push motor velocity of the push motor and a pull motor velocity of the pull motor based on a target wire feed speed; and compensating each of the push motor velocity of the push motor and the pull motor velocity of the pull motor based on the push motor velocity feedback and based on pull motor velocity feedback, wherein the push motor velocity and the pull motor velocity are based on a target wire tension.

16 Claims, 5 Drawing Sheets

SYSTEMS AND METHODS TO CONTROL WELDING WIRE TENSION

BACKGROUND

This disclosure relates generally to welding and, more particularly, to systems and methods to control welding wire tension.

When feeding aluminum welding wire through a long cable, the tension in the welding wire affects the performance and longevity of the feeding system and/or the welding torch. If the wire tension is too high, the wire may be subject to shaving along any edges in the feeder assembly, which will shorten the life of the liner and/or other consumables. Conversely, when the wire tension is too low (e.g., the wire is subject to compression), the wire may buckle, resulting in wasted time to clear a "bird's nest" of tangled wire and replacing the wire in the feeding system.

Moreover, tension that is too high or low will increase the power required by the pull motor, requiring a larger push-pull welding torch. A larger push-pull torch is generally less ergonomic for the welding operator. If the tension is too high, the pull motor has to produce more torque to keep the wire under tension. If the tension is too low, the wire may become compressed and the liner fills up with wire, which increases the liner's friction.

SUMMARY

Systems and methods to control welding wire tension are disclosed, substantially as illustrated by and described in connection with at least one of the figures, as set forth more completely in the claims.

BRIEF DESCRIPTION OF THE DRAWINGS

These and/or other aspects will become apparent and more readily appreciated from the following description of the exemplary embodiments, taken in conjunction with the accompanying drawings.

The figures are not necessarily to scale. Where appropriate, similar or identical reference numbers are used to refer to similar or identical components.

DETAILED DESCRIPTION

Figure 1:
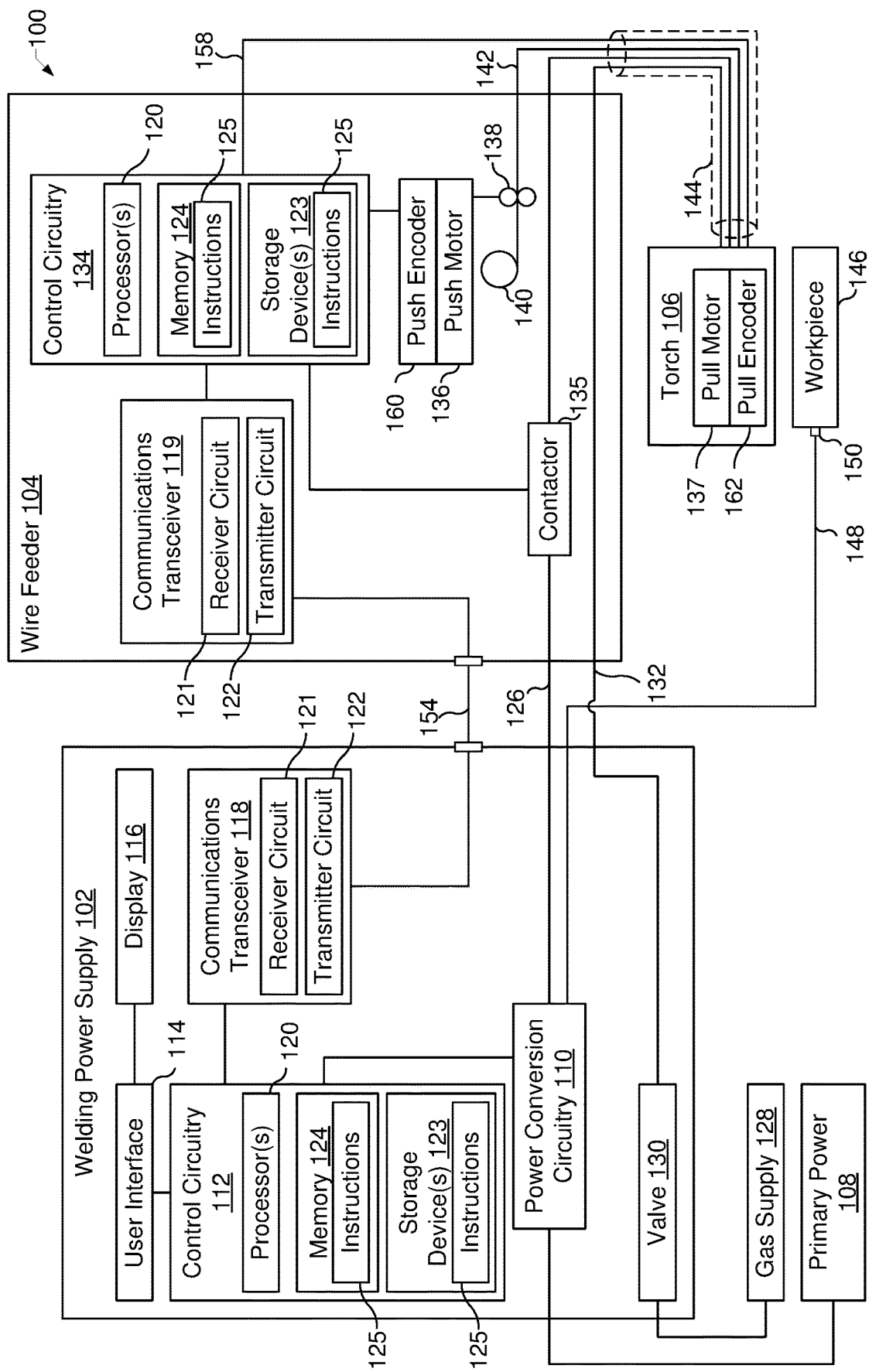
FIG. 1 is a block diagram of an example welding system to perform welding, including a welding-type power supply and a separate wire feeder in a push-pull wire feeding configuration, in accordance with aspects of this disclosure.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

Disclosed systems and methods control the push motor and pull motor in a welding system to control the tension in the welding wire. In contrast with conventional, speed-based or torque-based push-pull systems, disclosed systems and methods virtually couple the push motor and the pull motor to maintain a target wire tension. In some example systems and methods, the virtual coupling mimics or serves as a virtual tuned spring that reacts to disturbances in the push motor and/or pull motor to maintain the tension in the welding wire.

As used herein, the term "velocity" generally means "linear velocity," such as a wire feed velocity, unless otherwise stated. For example, while a wire feed push motor and/or pull motor may have an angular velocity, the angular velocity may be translated into a linear velocity, such as at the point the motor or corresponding drive rolls make contact with a welding wire, using corresponding terms such as gearbox ratios and drive roll radii.

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disclosed example welding wire feeders, include: a push motor configured to feed welding wire from a wire source; a first sensor configured to provide push motor velocity feedback; and control circuitry configured to control the push motor and a pull motor of a welding torch coupled to the welding wire feeder by: controlling a push motor velocity of the push motor and a pull motor velocity of the pull motor based on a target wire feed speed; and compensating each of the push motor velocity of the push motor and the pull motor velocity of the pull motor based on the push motor velocity feedback and based on pull motor velocity feedback, wherein the push motor velocity and the pull motor velocity are based on a target wire tension.

In some examples, the control circuitry is configured to generate a velocity command based on the target wire feed speed and the target wire tension, and the control circuitry is configured to control the push motor velocity of the push motor and the pull motor velocity of the pull motor based on the velocity command. In some example welding wire feeders, the control circuitry is configured to: estimate a wire slip velocity based on a push motor force and a pull motor force; estimate a wire tension in the welding wire based on the wire slip velocity, the push motor velocity feedback, and the pull motor velocity feedback; and compensate each of the push motor velocity of the push motor and the pull motor velocity of the pull motor based on the estimated wire tension and the estimated wire slip velocity.

In some example welding wire feeders, the control circuitry is configured to: determine an estimated friction force in response to the push motor velocity and the pull motor velocity reaching a threshold velocity based on a velocity command; and determine the wire slip velocity based on reducing a difference in the push motor force and the pull motor force by the estimated friction force. In some example welding wire feeders, the control circuitry is configured to estimate the wire tension based on adding the estimated wire slip velocity to a difference between the push motor velocity feedback and the pull motor velocity feedback.

In some examples, the first sensor comprises an encoder coupled to the push motor to measure at least one of an angular position or an angular velocity of the push motor. In some examples, the control circuitry is configured to, at a beginning of a welding operation, control the pull motor and the push motor to apply forces to the welding wire in opposing directions to establish a reference wire tension based on the target wire tension. In some examples, the control circuitry is configured to determine the pull motor velocity feedback based on receiving at least one of a pull motor angular velocity or a pull motor angular position from a pull motor encoder of the welding torch coupled to the welding wire feeder.

In some example welding wire feeders, the control circuitry is configured to set the target wire tension based on a type of the welding wire. In some example welding wire feeders, controlling the push motor velocity of the push motor involves generating a push motor force command, and controlling the pull motor velocity of the pull motor comprises generating a pull motor force command. In some examples, the control circuitry is configured to control the push motor velocity of the push motor by setting the push motor force command using an integrator based on a velocity command and the push motor velocity feedback. In some examples, the control circuitry is configured to control the pull motor velocity of the pull motor by setting a pull motor force using an integrator based on a velocity command and the pull motor velocity feedback.

Disclosed example methods to control welding wire tension involve: controlling a push motor velocity of a push motor of a welding wire feeder based on a target wire feed speed; controlling a pull motor velocity of a pull motor of a welding torch coupled to the welding wire feeder based on the target wire feed speed; and compensating each of the push motor velocity of the push motor and the pull motor velocity of the pull motor based on push motor velocity feedback and based on pull motor velocity feedback, wherein the push motor velocity and the pull motor velocity are based on a target wire tension.

In some example methods, the controlling of the push motor velocity of the push motor involves generating a push motor force command, and the controlling of the pull motor velocity of the pull motor comprises generating a pull motor force command. Some example methods further involve: estimating a wire slip velocity based on a push motor force and a pull motor force; estimating a wire tension in the welding wire based on the wire slip velocity, the push motor velocity feedback, and the pull motor velocity feedback; and compensating each of the push motor velocity of the push motor and the pull motor velocity of the pull motor based on the estimated wire tension and the estimated wire slip velocity. Some example methods further involve determining an estimated friction force in response to the push motor velocity and the pull motor velocity reaching a threshold velocity based on a velocity command, wherein the determining of the wire slip velocity is based on reducing a difference in the push motor force and the pull motor force by the estimated friction force.

In some example methods, the estimating of the wire tension is based on adding the estimated wire slip velocity to a difference between the push motor velocity feedback and the pull motor velocity feedback. Some example methods further involve measuring at least one of an angular position or an angular velocity of the push motor with an encoder, and determining the push motor velocity feedback based on the angular position or the angular velocity.

Some example methods further involve, at a beginning of a welding operation, controlling the pull motor and the push motor to apply forces to the welding wire in opposing directions to establish a reference wire tension based on the target wire tension. Some example methods further involve setting the target wire tension based on a type of the welding wire.

FIG. 1 is a block diagram of an example welding system to perform welding, including a welding-type power supply and a separate wire feeder in a push-pull wire feeding configuration. The example welding system 100 includes a welding-type power supply 102, a wire feeder 104, and a welding torch 106. The welding system 100 powers, controls, and supplies consumables to a welding application. The example welding torch 106 is configured for gas metal arc welding (GMAW). In the illustrated example, the power supply 102 is configured to supply power to the wire feeder 104, and the wire feeder 104 may be configured to route the input power to the welding torch 106. In addition to supplying an input power, the wire feeder 104 supplies a filler metal to a welding torch 106 for various welding applications (e.g., GMAW welding, flux core arc welding (FCAW)).

The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes a power conversion circuitry 110, which may include transformers, rectifiers, switches, and so forth, capable of converting the AC input power to AC and/or DC output power as dictated by the demands of the system 100 (e.g., particular welding processes and regimes). The power conversion circuitry 110 converts input power (e.g., the primary power 108) to welding-type power based on a weld voltage setpoint and outputs the welding-type power via a weld circuit.

In some examples, the power conversion circuitry 110 is configured to convert the primary power 108 to both welding-type power and auxiliary power outputs. However, in other examples, the power conversion circuitry 110 is adapted to convert primary power only to a weld power output, and a separate auxiliary converter is provided to convert primary power to auxiliary power. In some other examples, the power supply 102 receives a converted auxiliary power output directly from a wall outlet. Any suitable power conversion system or mechanism may be employed by the power supply 102 to generate and supply both weld and auxiliary power.

The power supply 102 includes control circuitry 112 to control the operation of the power supply 102. The power supply 102 also includes a user interface 114. The control circuitry 112 receives input from the user interface 114, through which a user may choose a process and/or input desired parameters (e.g., voltages, currents, particular pulsed or non-pulsed welding regimes, and so forth). The user interface 114 may receive inputs using any input device, such as via a keypad, keyboard, buttons, touch screen, voice activation system, wireless device, etc. Furthermore, the control circuitry 112 controls operating parameters based on input by the user as well as based on other current operating parameters. Specifically, the user interface 114 may include a display 116 for presenting, showing, or indicating, information to an operator. The control circuitry 112 may also include interface circuitry for communicating data to other devices in the system 100, such as the wire feeder 104. For example, in some situations, the power supply 102 wirelessly communicates with the wire feeder 104 and/or other welding devices within the welding system 100. Further, in some situations, the power supply 102 communicates with the wire feeder 104 and/or other welding devices using a wired connection, such as by using a network interface controller (NIC) to communicate data via a network (e.g., ETHERNET, 10BASE2, 10BASE-T, 100BASE-TX, etc.).

The control circuitry 112 includes at least one processor 120 that controls the operations of the power supply 102. The control circuitry 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device and/or logic circuit. For example, the processor 120 may include one or more digital signal processors (DSPs).

The example control circuitry 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding current data, detect short circuit parameters, determine amount of spatter) during operation.

In some examples, the welding power flows from the power conversion circuitry 110 through a weld cable 126 to the wire feeder 104 and the welding torch 106. The example weld cable 126 is attachable and detachable from weld studs at each of the power supply 102 and the wire feeder 104 (e.g., to enable ease of replacement of the weld cable 126 in case of wear or damage).

The example communications transceiver 118 includes a receiver circuit 121 and a transmitter circuit 122. Generally, the receiver circuit 121 receives data transmitted by the wire feeder 104 and the transmitter circuit 122 transmits data to the wire feeder 104. The example wire feeder 104 also includes a communications transceiver 119, which may be similar or identical in construction and/or function as the communications transceiver 118.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 112 to enable, inhibit, or control gas flow (e.g., shielding gas) through the valve 130. Shielding gas exits the valve 130 and flows through a gas conduit 132 (which in some implementations may be packaged with the welding power output) to the wire feeder 104 which provides the shielding gas to the welding application. In some examples, the welding system 100 does not include the gas supply 128, the valve 130, and/or the gas conduit 132. In some other examples, the valve 130 is located in the wire feeder 104, and, the gas supply 128 is connected to the wire feeder 104.

In some examples, the wire feeder 104 uses the welding power to power the various components in the wire feeder 104, such as to power wire feeder control circuitry 134. As noted above, the weld cable 126 may be configured to provide or supply the welding power. The wire feeder control circuitry 134 controls the operations of the wire feeder 104. In some examples, the wire feeder 104 uses the wire feeder control circuitry 134 to detect whether the wire feeder 104 is in communication with the power supply 102 and to detect a current welding process of the power supply 102 if the wire feeder 104 is in communication with the power supply 102.

A contactor 135 (e.g., high amperage relay) is controlled by the wire feeder control circuitry 134 and configured to enable or inhibit welding power to continue to flow to the weld cable 126 for the welding application. In some examples, the contactor 135 is an electromechanical device. However, the contactor 135 may be any other suitable device, such as a solid state device, and/or may be omitted entirely and the weld cable 126 is directly connected to the output to the welding torch 106.

The example system 100 of FIG. 1 is configured as a push-pull configuration, which is used for certain welding applications such as aluminum welding. In the push-pull configuration, the wire feeder 104 includes a push motor 136 that receives control signals from the wire feeder control circuitry 134 to drive rollers 138 that rotate to pull wire off a spool 140 of wire. The push motor 136 feeds electrode wire to the welding torch 106. In the push-pull configuration, the example welding torch 106 of FIG. 1 is a push-pull type welding torch, which includes a pull motor 137, which aids in maintaining proper tension on the wire to avoid buckling that might occur if only the push motor 136 were used to feed the wire.

The wire 142 is provided to the welding torch 106 through a torch cable 144. Likewise, the wire feeder 104 may provide the shielding gas from the gas conduit 132 and combined in a torch cable 144. The electrode wire, the shield gas, and the power from the weld cable 126 are bundled together in a single torch cable 144 and/or individually provided to the welding torch 106.

The welding torch 106 delivers the wire, welding power, and/or shielding gas for a welding application. The welding torch 106 is used to establish a welding arc between the welding torch 106 and a workpiece 146. A work cable 148 couples the workpiece 146 to the power supply 102 (e.g., to the power conversion circuitry 110) to provide a return path for the weld current (e.g., as part of the weld circuit). The example work cable 148 is attachable and/or detachable from the power supply 102 for ease of replacement of the work cable 148. The work cable 148 may be terminated with a clamp 150 (or another power connecting device), which couples the power supply 102 to the workpiece 146.

A communication cable 154 connected between the power supply 102 and the wire feeder 104, which enables bidirectional communication between the transceivers 118, 119. The communications transceivers 118 and 119 may communicate via the communication cable 154, via the weld circuit, via wireless communications, and/or any other communication medium. Examples of such communications include weld cable voltage measured at a device that is remote from the power supply 102 (e.g., the wire feeder 104).

The example control circuitry 134 of FIG. 1 controls the push motor 136 and the pull motor 137 (e.g., via control lines 158). The control lines 158 include conductors to provide power and/or commands to the pull motor 137. As disclosed in more detail below, the control circuitry 134 (e.g., via the processor(s) 120 executing the instructions 125) controls the force (e.g., the current, torque, etc.) output by the push motor 136 and the force (e.g., the current, torque, etc.) output by the pull motor 137. For example, the control circuitry 134 may control the current provided to each of the push motor 136 and the pull motor 137 based on a tension control scheme. An example tension control scheme, as disclosed in more detail below, is based on inputs specifying a target wire feed speed and a target wire tension. The target wire tension may be based on a selected wire type and/or wire diameter.

To implement the control, the example control circuitry 134 receives angular velocity, angular position, linear velocity, and/or linear position information about the push motor 136 from a first encoder 160 (e.g., a push motor encoder, or push encoder), and receives angular velocity, angular position, linear velocity, and/or linear position information about the pull motor 137 from a second encoder 162 (e.g., a pull motor encoder, or pull encoder) in the welding torch 106 via the control lines 158.

Figure 2:
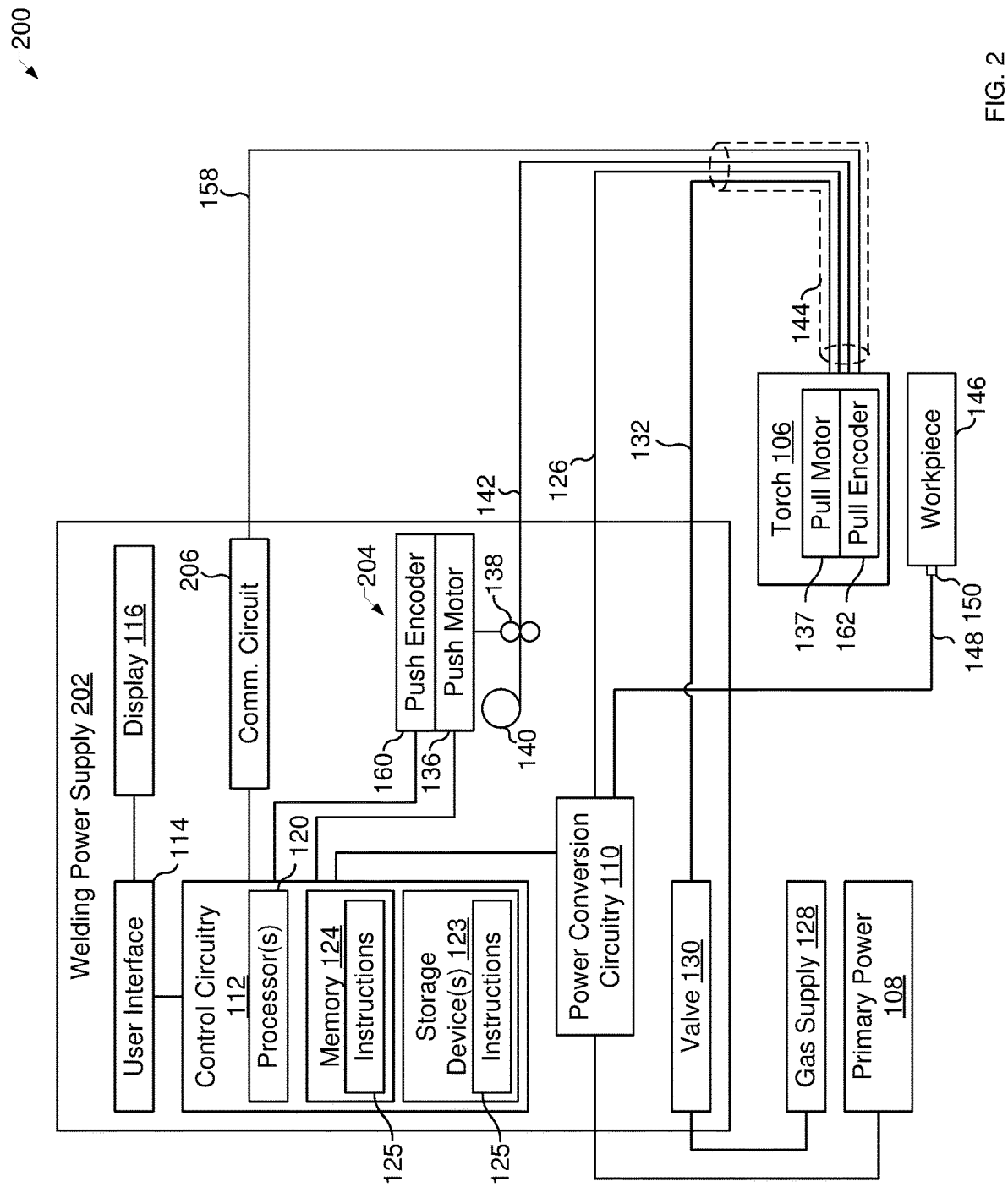
FIG. 2 is a block diagram of another example welding system to perform welding, in which a welding-type power supply includes an integral wire feeder in a push-pull wire feeding configuration, in accordance with aspects of this disclosure.

FIG. 2 is a block diagram of another example welding system 200 to perform welding, in which a welding-type power supply 202 includes an integrated wire feeder 204 in a push-pull wire feeding configuration. The example welding-type power supply 202 includes the power conversion circuitry 110, control circuitry 112, the user interface 114, the display 116, the processor(s) 120, the storage devices(s) 123, the memory 124, the instructions 125, and the valve 130 of the example power supply 102 of FIG. 1.

In contrast with the example system 100, in the example of FIG. 2 the power supply 202 includes the integrated wire feeder 204 instead being connected to a remote wire feeder. The power supply 202 of FIG. 2 outputs welding-type power and electrode wire to the torch 106, which includes the example power selector circuit 156.

The integrated wire feeder 204 includes the push motor 136, the drive rollers 138, and the wire spool 140, and feeds the wire through a torch cable 144 to the torch 106.

The example welding-type power supply 202 includes a communication circuit 206 to receive data via the control lines 158 from the pull encoder 162 (e.g., during a welding operation). In some examples, the communication circuit 206 converts an analog signal to a digital signal for use by the control circuitry 112 and/or receives a digital signal from the pull encoder 162.

The control circuitry 112 may reference a synergic control scheme, such as an algorithm or a lookup table, to determine target tension and/or a target wire feed speed corresponding to the user input. A lookup table may be stored in, for example, the storage device(s) 123 and/or the memory 124 of the control circuitry 112.

During operation, and as disclosed in more detail below, the example control circuitry 112, 134 of FIGS. 1 and 2 control the push motor 136 and the pull motor 137 by controlling a push motor velocity $v_{ps}$ of the push motor 136 and a pull motor velocity $v_{pl}$ of the pull motor 137 based on a target wire feed speed $v^*_{wfs}$, and compensates each of the push motor velocity $v_{ps}$ of the push motor 136 and the pull motor velocity $v_{pl}$ of the pull motor 137 based on the push motor velocity feedback $v_{ps}$ and based on pull motor velocity feedback $v_{pl}$. The control circuitry 112, 134 controls and/or compensates the push motor velocity $v_{ps}$ and the pull motor velocity $v_{pl}$ based on a target wire tension $\tau^*_r$. In particular, the control circuitry 112, 134 controls the push motor velocity $v_{ps}$ by generating a push motor force command $F^*_{ps}$, and controls the pull motor velocity $v_{pl}$ of the pull motor 137 comprises generating a pull motor force command $F^*_{pl}$.

Figure 3:
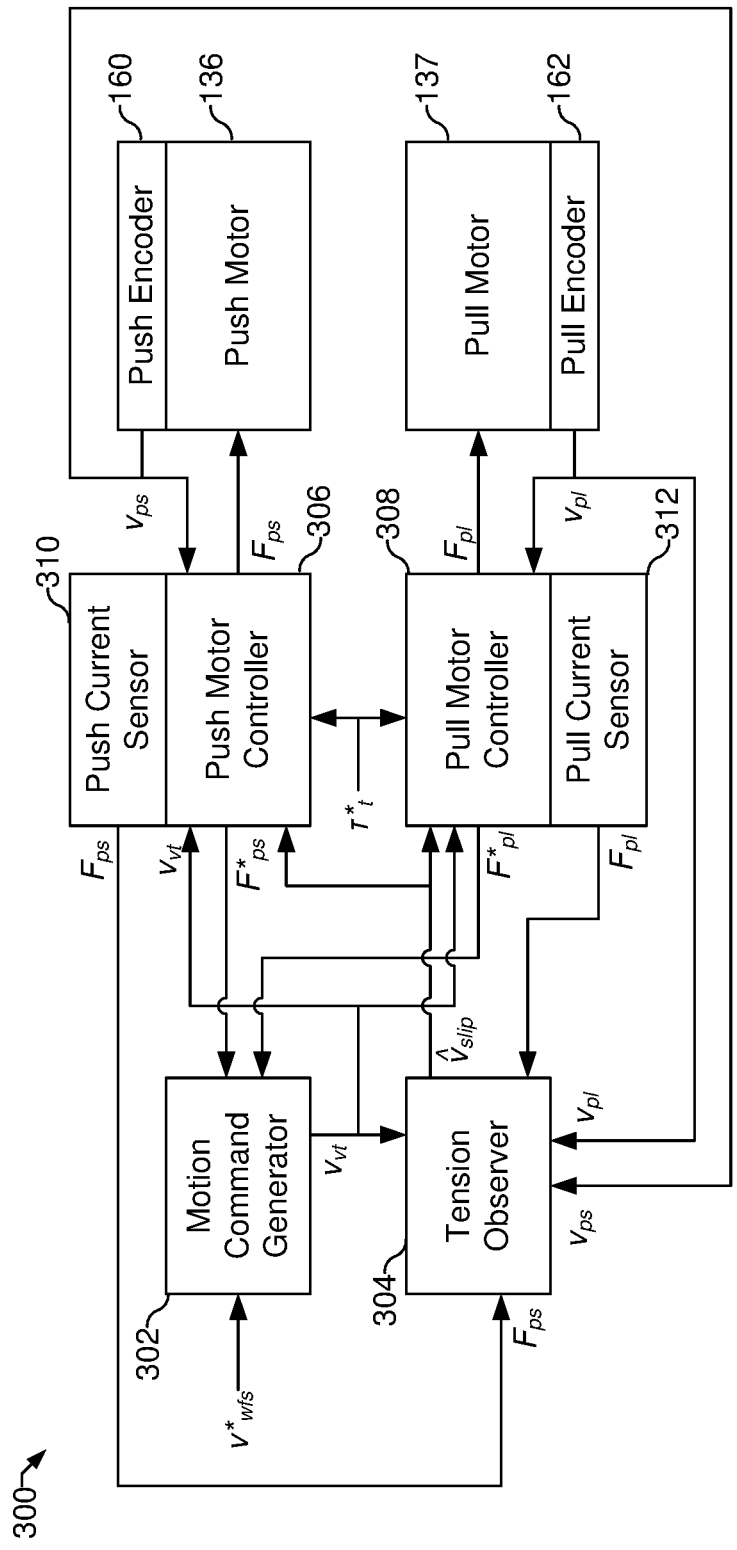
FIG. 3 is a block diagram of an example tension control system that may be implemented by the welding system of FIG. 1 or 2 to control a wire tension in the push-pull wire feeding configuration.

FIG. 3 is a block diagram of an example tension control system 300 that may be implemented by the welding system 100, 200 of FIG. 1 or 2 to control a wire tension in the push-pull wire feeding configuration. The example tension control system 300 may be implemented by, for example, the processor(s) 120 executing the machine readable instructions 125, by an application specific integrated circuit, and/or any combination of hardware, software, and/or firmware.

The example tension control system 300 of FIG. 3 includes a motion command generator 302, a tension observer 304, a push motor controller 306, and a pull motor controller 308. The example system 300 further includes a push current sensor 310 and a pull current sensor 312. The push motor controller 306 controls a push motor force $F_{ps}$ applied by the push motor 136, and the pull motor controller 308 controls a pull motor force $F_{pl}$ applied by the pull motor 137. The sensors 310, 312 measure the push motor force $F_{ps}$ and the pull motor force $F_{pl}$ (e.g., torque, which is based on the current through the motor) applied by the respective ones of the push motor 136 and the pull motor 137.

Figure 4:
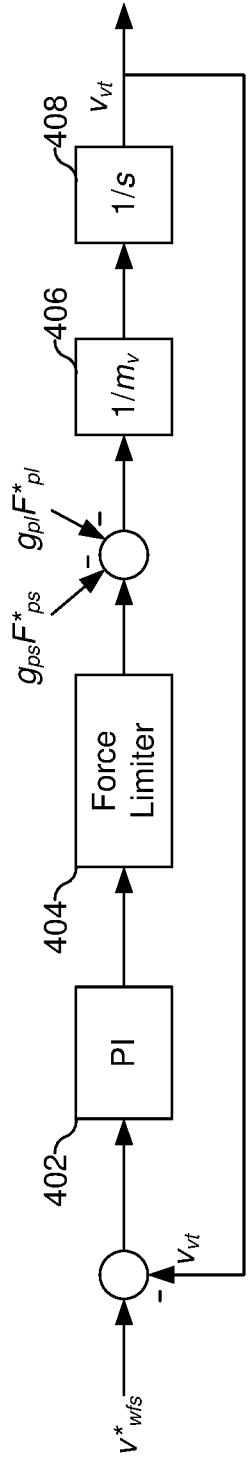
FIG. 4 is a block diagram of an example implementation of the example motion command generator of FIG. 3.

The example motion command generator 302 generates a velocity command $v_{vt}$ to the push motor controller 306 and the pull motor controller 308. The example velocity command $v_{vt}$ is based on a target wire feed speed $v^*_{wfs}$, and force command feedback from the push motor controller 306 and the pull motor controller 308. FIG. 4 is a block diagram of an example implementation of the example motion command generator 302 of FIG. 3. The motion command generator 302 may be implemented by the control circuitry 112, 134 of FIGS. 1 and/or 2. The example motion command generator 302 includes at least one integrator (e.g., a PI controller 402), a force limiter 404, and integrators 406, 408 to generate the velocity command $v_{vt}$. receives the target wire feed speed $v^*_{wfs}$, a push force command $F^*_{ps}$ (e.g., calculated by the push motor controller 306), and a pull force command $F^*_{pl}$ (e.g., calculated by the pull motor controller 308).

The example PI controller 402 includes at least one integrator and may include one or more proportional terms, and is tuned so that the push motor 136 and the pull motor 137 can follow the velocity command $v_{vt}$. The force limiter 404 affects or limits a combined acceleration of the motors 136, 137, and filters the output of the PI controller 402 to avoid commanding a velocity change that would require more force (e.g., current) than allowed for the push motor 136 and the pull motor 137. The push force command $F^*_{ps}$ and a pull force command $F^*_{pl}$ are input as feedback of the commanded, unconstrained forces $F^*_{ps}$ and $F^*_{pl}$ from the push motor controller 306 and the pull motor controller 308. The motion command generator 302 scales the push force command $F_{ps}$ and a pull force command $F^*_{pl}$ by the respective virtual gear ratios $g_{ps}$ and $g_{pl}$ of the push motor 136 and the pull motor 137 for input to the control loop. The virtual gear ratios $g_{ps}$ and $g_{pl}$ may be set to match or balance the powers of the push motor 136 and the pull motor 137 so that perturbations in one of the push motor 136 or the pull motor 137 appropriately affects the response by the other of the motors 136, 137.

If either the push motor 136 or the pull motor 137 runs into its force limits and the corresponding PI regulator of the push motor controller 306 or the pull motor controller 308 will wind up, the motion command generator 302 decreases the velocity command $v_{vt}$ so that the tension in the wire does not become too large or too small relative to the target tension rt. The velocity command $v_{vt}$ is also fed back to the control loop of the motion command generator 302.

The resulting force $F_{vt}$ following the scaled push force command $F^*_{ps}$ and a pull force command $F^*_{pl}$ feedback is converted to the velocity command $v_{vt}$ by integrators 406, 408. The velocity command $v_{vt}$ is output to the push motor controller 306 and to the pull motor controller 308.

Figure 5:
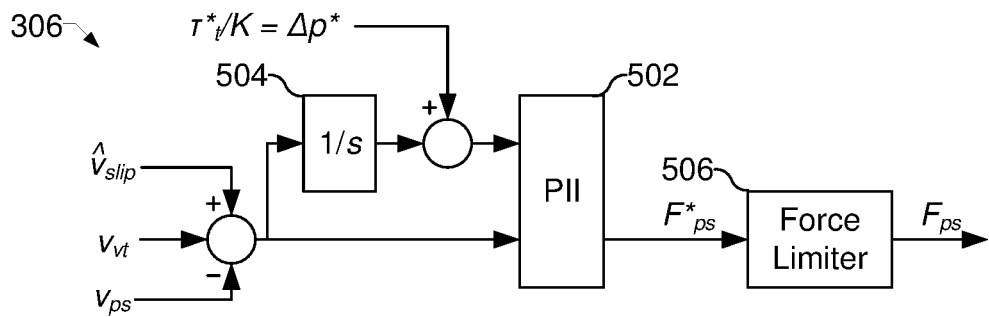
FIG. 5 is a block diagram of an example implementation of the example push motor controller of FIG. 3.
Figure 6:
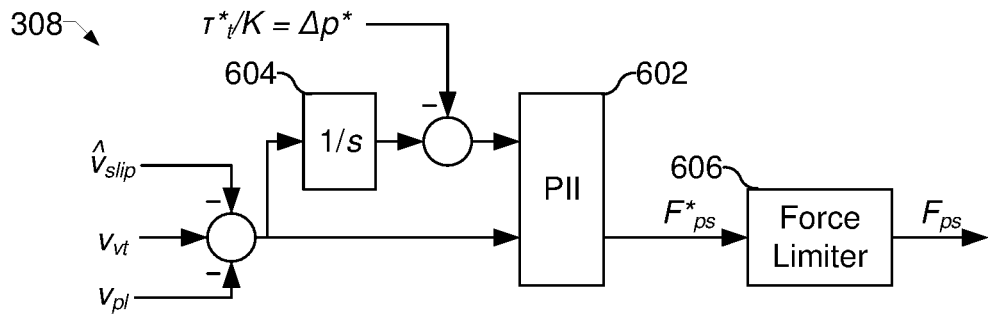
FIG. 6 is a block diagram of an example implementation of the example push motor controller of FIG. 3.
Figure 7:
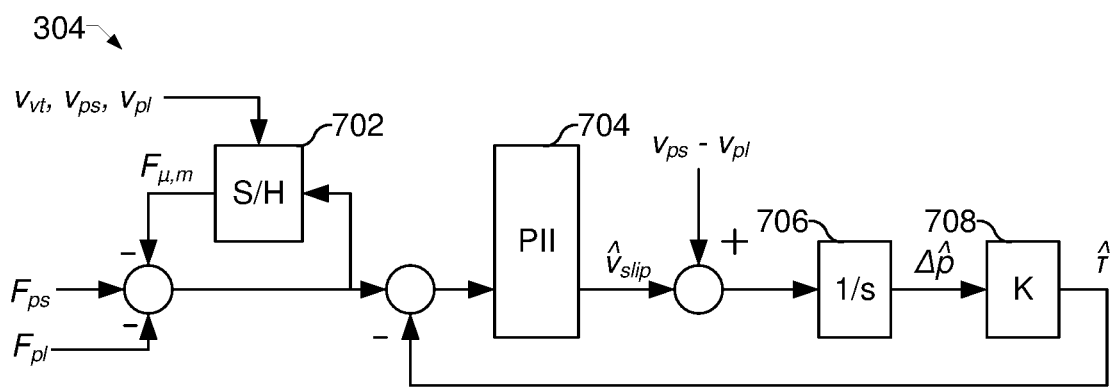
FIG. 7 is a block diagram of an example implementation of the example tension observer of FIG. 3.

The example push motor controller 306 controls a push motor velocity $v_{ps}$ of the push motor 136 based on the target wire feed speed $v^*_{wfs}$, and the target wire tension $\tau^*$. FIG. 5 is a block diagram of an example implementation of the example push motor controller 306 of FIG. 3. In a similar manner, the pull motor controller 308 controls a pull motor velocity $v_{vt}$ of the pull motor 137 based on the target wire feed speed $v^*_{wfs}$, and the target wire tension $\tau^*$. FIG. 6 is a block diagram of an example implementation of the example push motor controller 308 of FIG. 3.

The example push motor controller 306 and the pull motor controller 308 each include at least one integrator, and may include one or more proportional terms. In the examples of FIGS. 5 and 6, the push motor controller 306 and the pull motor controller 308 each include respective PII controllers 502, 602.

The PII controller 502 of FIG. 5 receives a compensated velocity command $v_{vt}$, which is compensated by subtracting the push motor velocity feedback $v_{ps}$ and adding the estimated slip velocity $\hat{v}_{slip}$. The motion command generator 302 can be considered as a virtual motor, which has a corresponding velocity (e.g., the velocity command $v_{vt}$). The proportional terms of the PII controllers 502, 602 each control the difference in velocity between the respective motor (e.g., $v_{ps}$, $v_{pl}$) and the velocity $v_{vt}$ of the motion command generator 302 as a virtual motor. The proportional terms add damping between the physical motors 136, 137 and motion command generator 302 as the virtual motor.

The PII controller 502 further receives a wire position term based on the integrated velocity error (e.g., via integrator 504) and a position offset $\Delta p^*$. The position offset $\Delta p^*$ is based on the target wire tension and a tuned spring constant K, one or both of which may be selected based on the selected wire type. The position offset $\Delta p^*$ may be substantially constant over the course of a welding operation. In the example of FIG. 5, the PII controller 502 includes a second integrator to reduce or eliminate steady state error in the PII controller 502.

The PII controller 502 outputs a commanded push motor force $F^*_{ps}$ to a force limiter 506, which limits the force (e.g., current) command that is output to the push motor 136. The resulting push motor force $F_{ps}$ is output to the push motor 136 (e.g., as the corresponding current or power to drive the push motor 136). The example push current sensor 310 measures the push motor force $F_{ps}$ and provides the measured push motor force $F_{ps}$ as feedback to the tension observer 304. The push motor controller 306 also outputs the commanded push motor force $F^*_{ps}$ to the motion command generator 302 as feedback, as described above.

The example pull motor controller 308 of FIG. 6 includes a PII controller 602, which may be similar to the PII controller 502 of FIG. 5, except that the PII controller 602 is tuned to the characteristics of the pull motor 137 instead of the push motor 136. For example, the PII controller 602 receives a compensated velocity command $v_{vt}$, which is compensated by subtracting the pull motor velocity feedback $v_{pl}$ and subtracting the estimated slip velocity $\hat{v}_{slip}$. The PII controller 602 further receives a wire position term based on the integrated velocity error (e.g., via integrator 604) and the position offset $\Delta p^*$. The PII controller 602 also includes a second integrator to reduce or eliminate steady state error in the PII controller 602.

The PII controller 602 outputs a commanded push motor force $F^*_{pl}$ to a force limiter 606, which limits the force (e.g., current) command that is output to the pull motor 137. The resulting pull motor force $F_{pl}$ is output to the pull motor 137 (e.g., as the corresponding current or power to drive the pull motor 137). The example pull current sensor 312 measures the pull motor force $F_{pl}$ and provides the measured pull motor force $F_{pl}$ as feedback to the tension observer 304. The pull motor controller 308 also outputs the commanded pull motor force $F^*_{pl}$ to the motion command generator 302 as feedback, as described above.

While example PII controllers 502, 602 are disclosed above, the motor controllers 306, 308 may include more or fewer proportional and/or integral terms. In some examples, the PII controllers 502, 602 include one or more differential terms, such as when position feedback is received from the encoders 160, 162. Such position feedback may be processed by a differential term in the controllers 502, 602 (e.g., now PID controllers) to determine velocity.

As shown above, the example motor controllers 306, 308 are each controlled independently, but are also virtually coupled via the motion command generator 302 which incorporates feedback from both motor controllers 306, 308.

The example motion command generator 302 and the motor controllers 306, 308 of FIGS. 3-6 control the motors 136, 137 based on velocity feedback. However, in practical systems, controlling the differential position of the motor is not sufficient to maintain the desired tension. Over time, the drive rolls coupled to the wire will slip relative to the wire, so the motor velocity will not equal the wire velocity. The difference in velocity causes a reduction in the tension in the wire over time. However, it may take time on the order of seconds until the reduction in tension due to slip is noticeable in the motor force feedback. The example tension observer 304 estimates the wire tension in the wire based on feedback from the push motor force $F_{ps}$ (e.g., from the push current sensor 310), the pull motor force $F_{pl}$ (e.g., from the push current sensor 310), the push motor velocity $v_{ps}$, the pull motor velocity $v_{pl}$, and the velocity command $v_{vt}$.

The example tension observer 304 uses the difference in force between the push motor 136 and the pull motor 137 to estimate the wire slip velocity. However, the motor force difference contains the wire tension, the difference in motor friction, and the acceleration forces in the motors 136, 137. Since the motors 136, 137 accelerate only for a short period, the acceleration forces are filtered out by tuning a PI regulator 704 of the tension observer 304 to be slower than the motor controllers 306, 308.

In the example of FIG. 6, the tension observer 304 first determines an estimated friction force $F_{\mu,m}$. The friction force $F_{\mu,m}$ represents both motor friction and wire friction within the length of the cable. To estimate the friction force $F_{\mu}$, the tension observer 304 samples and holds 702 a force difference $F_{ps}-F_{pl}$ in response to the push motor velocity $v_{ps}$ and/or the pull motor velocity $v_{pl}$ reaching a threshold, which may be based on the velocity command $v_{vt}$. At the time the push motor velocity $v_{ps}$ and/or the pull motor velocity $v_{pl}$ reach the threshold, it may be assumed that the force difference contains only the tension and the friction terms. Under the further assumption that there has been little slip up to the point that the sample and hold 702 is triggered, and the force difference $F_{ps}-F_{pl}$ is mainly the frictional losses, the sample and hold element 702 will decouple the frictional forces frictional force $F_{\mu,m}$ from the tension estimation by subtracting the frictional force $F_{\mu,m}$ from the force difference $F_{ps}-F_{pl}$.

The tension observer 304 estimates a wire slip velocity $\hat{v}_{slip}$ based on the push motor force $F_{ps}$ and a pull motor force $F_{pl}$, and removes the wire slip velocity $\hat{v}_{slip}$ from the motor velocity difference (e.g., $v_{ps}-v_{pl}$). The tension observer 304 receives the velocity feedback from the push encoder 160 and the pull encoder 162. The resulting velocity is integrated at integrator 706 and multiplied by the spring constant K 708 to estimate the wire tension $\hat{\tau}$. The estimated wire tension may be used as feedback to estimate the wire slip velocity $\hat{v}_{slip}$. The estimated wire slip velocity $\hat{v}_{slip}$ is further provided to the motor controllers 306, 308.

In some examples, the control circuitry 134 performs a tension initialization at the beginning of each welding operation (e.g., when the motors 136, 137 are first accelerated). During the tension initialization, the control circuitry 134 commands the forces of the push motor 136 and the pull motor 137 in opposing directions to establish an initialization tension. The control circuitry 134 (e.g., the tension control system 300) may use the initialization tension as the reference tension or "zero" tension, with respect to the target tension $\tau_t$.

The example tension observer 304 estimates a wire slip velocity $\hat{v}_{slip}$ between the push motor 136 and the wire and/or the pull motor 137 and the wire, and estimates the tension in the wire to determine the wire slip velocity.

Figure 8:
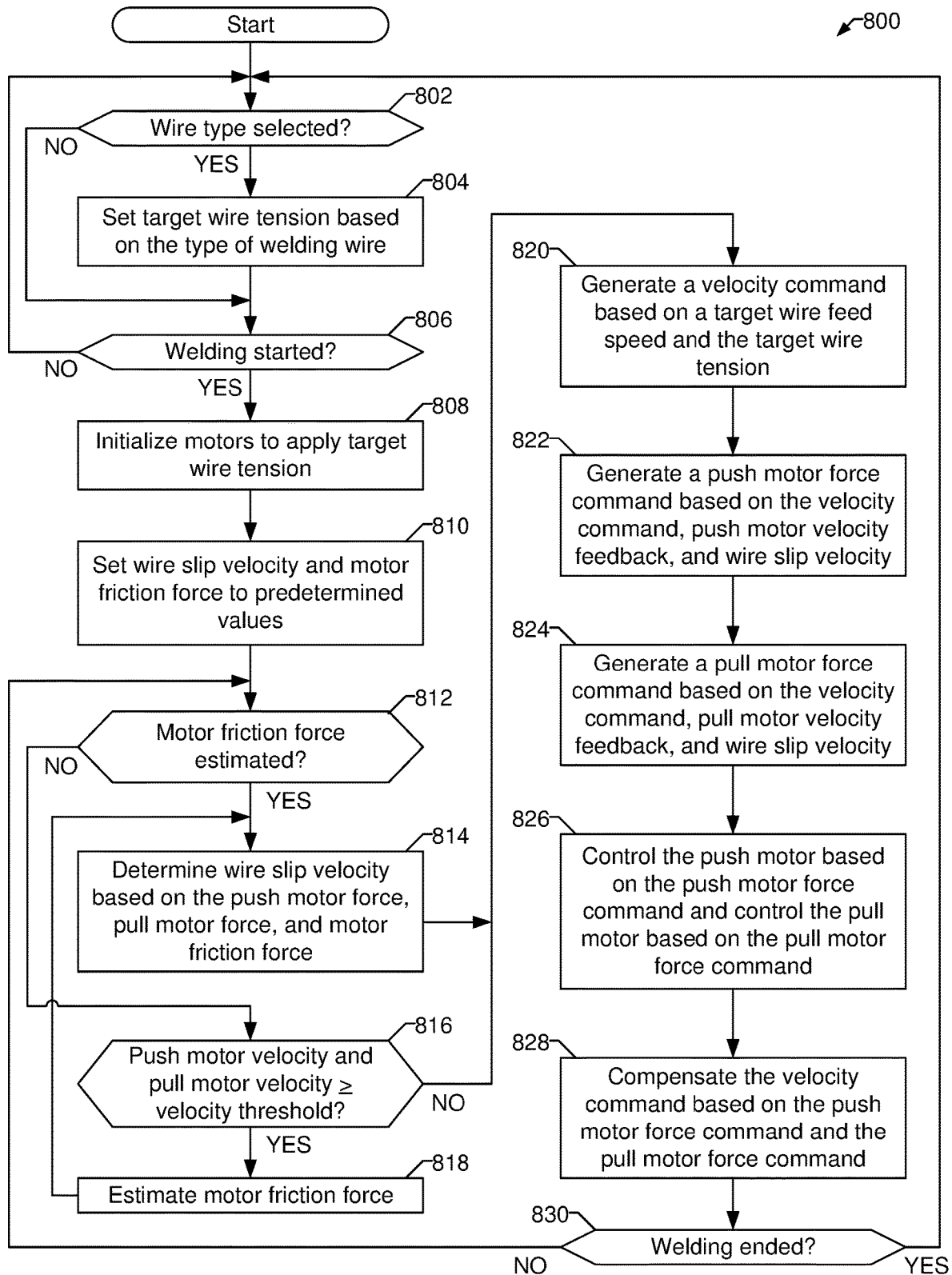
FIG. 8 is a flowchart representative of example machine readable instructions which may be executed by the example welding system of FIG. 1 or 2 to implement the tension control system of FIGS. 3-7.

FIG. 8 is a flowchart representative of example machine readable instructions 800 which may be executed by the example welding system 100, 200 of FIG. 1 or 2 to implement the tension control system 300 of FIGS. 3-7. The example instructions 800 may be executed by the example control circuitry 112, 134 (e.g., via the processor(s) 120) of FIGS. 1 and/or 2.

At block 802, the control circuitry 134 determines whether a wire type has been selected. For example, an operator may select a wire type, a wire size, and/or other characteristics of the wire via a user interface (e.g., the user interface 114). If a wire type has been selected (block 802), at block 804 the control circuitry 134 sets a target wire tension $\tau^*_t$. For example, the control circuitry 134 may look up the target wire tension $\tau^*_t$ in a look up table stored in the memory 124 and/or the storage device(s) 123.

After setting the target wire tension $\tau^*_t$ (block 804), or if a wire type has not been selected (block 802), at block 806 the control circuitry 134 determines whether welding has started. If welding has not started (block 806), control returns to block 802.

If welding has started (block 806), at block 808 the control circuitry 134 initializes the push motor 136 and the pull motor 137 to apply the target wire tension $\tau^*_t$. For example, the control circuitry 134 may command the forces of the push motor 136 and the pull motor 137 in opposing directions to establish an initialization tension.

At block 810, the control circuitry 134 sets a wire slip velocity $\hat{v}_{slip}$ and a friction force $F_{\mu,m}$ to predetermined values. For example, the predetermined values may be estimated values, values that do not substantially affect the control loops prior to determining updated values of wire slip velocity $\hat{v}_{slip}$ and the friction force $F_{\mu,m}$.

At block 812, the control circuitry 134 determines whether a friction force $F_{\mu,m}$ has been estimated. For example, the control circuitry 134 may determine whether the sample and hold element 702 has been triggered. If the friction force $F_{\mu,m}$ has been estimated (block 812), at block 814 the control circuitry 134 determines a wire slip velocity $\hat{v}_{slip}$ based on the push motor force $F_{ps}$, the pull motor force $F_{pl}$, and the friction force $F_{\mu,m}$. For example, the control circuitry 134 may implement the tension observer 304 of FIG. 7 to determine the wire slip velocity $\hat{v}_{slip}$.

If the friction force $F_{\mu,m}$ has not been estimated (block 812), at block 816 the control circuitry 134 determines whether a push motor velocity $v_{ps}$ and a pull motor velocity $v_{pl}$ is at least a threshold velocity. The threshold velocity may be, for example, the velocity command $v_{vt}$ and/or the commanded wire feed speed $v^*_{wfs}$. In some examples, the threshold velocity may be different velocities (e.g., different linear velocity thresholds, different angular velocity thresholds). If the push motor velocity $v_{ps}$ and the pull motor velocity $v_{pl}$ is at least the threshold velocity (block 816), at block 818 the control circuitry 134 estimates the friction force $F_{\mu,m}$. For example, the sample and hold element 702 of the tension observer 304 may hold a force difference $F_{ps}-F_{pl}$ captured at the time the push motor velocity $v_{ps}$ and the pull motor velocity $v_{pl}$ reach or exceed the threshold velocity. After estimating the friction force $F_{\mu,m}$, control returns to block 814 to determine the wire slip velocity $\hat{v}_{slip}$.

After determining the wire slip velocity $\hat{v}_{slip}$ (block 814), or if the push motor velocity $v_{ps}$ and the pull motor velocity $v_{pl}$ are less than the threshold velocity (block 816), at block 820 the control circuitry 134 generates a velocity command $v_{vt}$ based on the target wire feed speed $v^*_{wfs}$ and the target wire tension $\tau^*_t$. For example, the control circuitry 134 may implement the motion command generator 302 of FIG. 4 to generate the velocity command $v_{vt}$.

At block 822, the control circuitry 134 generates a push motor force command $F^*_{ps}$ based on the velocity command $v_{vt}$, push motor velocity feedback $v_{ps}$, and the wire slip velocity $\hat{v}_{slip}$. For example, the control circuitry 134 may implement the push motor controller 306 of FIG. 5 to generate the push motor force command $F^*_{ps}$.

At block 824, the control circuitry 134 generates a pull motor force command $F^*_{pl}$ based on the velocity command $v_{vt}$, pull motor velocity feedback $v_{pl}$, and the wire slip velocity $\hat{v}_{slip}$. For example, the control circuitry 134 may implement the pull motor controller 308 of FIG. 6 to generate the push motor force command $F^*_{ps}$.

At block 826, the control circuitry 134 controls the push motor 136 based on the push motor force command $F^*_{ps}$ and controls the pull motor 137 based on the pull motor force command $F^*_{pl}$. For example, the control circuitry 134 may apply respective force limiters 506, 606 to the push motor force command $F^*_{ps}$ and the pull motor force command $F^*_{pl}$, and output corresponding push force $F_{ps}$ (e.g., current, torque) to the push motor 136 and pull force $F_{pl}$ (e.g., current, torque) to the pull motor 137.

At block 828, the control circuitry 134 compensates the velocity command $v_{vt}$ based on the push motor force command $F^*_{ps}$ and the pull motor force command $F^*_{pl}$. For example, the control circuitry 134 may implement the motion command generator 302 of FIG. 4 to compensate the velocity command $v_{vt}$ based on the push motor force command $F^*_{ps}$ and the pull motor force command $F^*_{pl}$ (e.g., based on respective virtual gear ratio factors $g_{ps}$ and $g_{pl}$).

At block 830, the control circuitry 134 determines whether welding has ended. If welding is ended, control returns to block 802. If welding is ongoing, control returns to block 812 to continue the closed-loop control and compensation.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power source with a program or other code that, when being loaded and executed, controls the welding power source such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

An example control circuit implementation may be a microcontroller, a field programmable logic circuit and/or any other control or logic circuit capable of executing instructions that executes weld control software. The control circuit could also be implemented in analog circuits and/or a combination of digital and analog circuitry.

As utilized herein the terms "circuits" and "circuitry" refer to physical electronic components (i.e. hardware) and any software and/or firmware (code) that may configure the hardware, be executed by the hardware, and/or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding wire feeder, comprising:
   a push motor configured to feed welding wire from a wire source;
   a first sensor configured to provide push motor velocity feedback; and
   control circuitry configured to control the push motor and a pull motor of a welding torch coupled to the welding wire feeder by: controlling a push motor velocity of the push motor and a pull motor velocity of the pull motor based on a target wire feed speed;
   determine an estimated friction force in response to the push motor velocity and the pull motor velocity reaching a threshold velocity based on a velocity command;
   estimating a wire slip velocity based on a push motor force and a pull motor force;
   estimating a wire tension in the welding wire based on the wire slip velocity, the push motor velocity feedback, and the pull motor velocity feedback, based on reducing a difference in the push motor force and the pull motor force by the estimated friction force; and
   compensating each of the push motor velocity of the push motor and the pull motor velocity of the pull motor based on the push motor velocity feedback, pull motor velocity feedback, the estimated wire tension, and the estimated wire slip velocity, wherein the push motor velocity and the pull motor velocity are based on a target wire tension.

2. The welding wire feeder as defined in claim 1, wherein the control circuitry is configured to generate a velocity command based on the target wire feed speed and the target wire tension, and the control circuitry is configured to control the push motor velocity of the push motor and the pull motor velocity of the pull motor based on the velocity command.

3. The welding wire feeder as defined in claim 1, wherein the control circuitry is configured to estimate the wire tension based on adding the estimated wire slip velocity to a difference between the push motor velocity feedback and the pull motor velocity feedback.

4. The welding wire feeder as defined in claim 1, wherein the first sensor comprises an encoder coupled to the push motor to measure at least one of an angular position or an angular velocity of the push motor.

5. The welding wire feeder as defined in claim 1, wherein the control circuitry is configured to, at a beginning of a welding operation, control the pull motor and the push motor to apply forces to the welding wire in opposing directions to establish a reference wire tension based on the target wire tension.

6. The welding wire feeder as defined in claim 1, wherein the control circuitry is configured to determine the pull motor velocity feedback based on receiving at least one of a pull motor angular velocity or a pull motor angular position from a pull motor encoder of the welding torch coupled to the welding wire feeder.

7. The welding wire feeder as defined in claim 1, wherein the control circuitry is configured to set the target wire tension based on a type of the welding wire.

8. The welding wire feeder as defined in claim 1, wherein controlling the push motor velocity of the push motor comprises generating a push motor force command, and controlling the pull motor velocity of the pull motor comprises generating a pull motor force command.

9. The welding wire feeder as defined in claim 8, wherein the control circuitry is configured to control the push motor velocity of the push motor by setting the push motor force command using an integrator based on a velocity command and the push motor velocity feedback.

10. The welding wire feeder as defined in claim 8, wherein the control circuitry is configured to control the pull motor velocity of the pull motor by setting a pull motor force using an integrator based on a velocity command and the pull motor velocity feedback.

11. A method to control welding wire tension, the method comprising:
controlling, via control circuitry, a push motor velocity of a push motor of a welding wire feeder based on a target wire feed speed;
controlling, via the control circuitry, a pull motor velocity of a pull motor of a welding torch coupled to the welding wire feeder based on the target wire feed speed;
determining, via the control circuitry, an estimated friction force in response to the push motor velocity and the pull motor velocity reaching a threshold velocity based on a velocity command;
estimating, via the control circuitry, a wire slip velocity based on a push motor force and a pull motor force;
estimating, via the control circuitry, a wire tension in the welding wire based on the wire slip velocity, the push motor velocity feedback, and the pull motor velocity feedback, based on reducing a difference in the push motor force and the pull motor force by the estimated friction force; and
compensating, via the control circuitry, each of the push motor velocity of the push motor and the pull motor velocity of the pull motor based on push motor velocity feedback, pull motor velocity feedback, the estimated wire tension, and the estimated wire slip velocity, wherein the push motor velocity and the pull motor velocity are based on a target wire tension.

12. The method as defined in claim 11, wherein the controlling of the push motor velocity of the push motor comprises generating a push motor force command, and the controlling of the pull motor velocity of the pull motor comprises generating a pull motor force command.

13. The method as defined in claim 11, wherein the estimating of the wire tension is based on adding the estimated wire slip velocity to a difference between the push motor velocity feedback and the pull motor velocity feedback.

14. The method as defined in claim 11, further comprising measuring at least one of an angular position or an angular velocity of the push motor with an encoder, and determining the push motor velocity feedback based on the angular position or the angular velocity.

15. The method as defined in claim 11, further comprising, at a beginning of a welding operation, controlling the pull motor and the push motor to apply forces to the welding wire in opposing directions to establish a reference wire tension based on the target wire tension.

16. The method as defined in claim 11, further comprising setting the target wire tension based on a type of the welding wire.

* * * * *